Dec. 31, 1968 A. HOFFMAN 3,419,454
METHOD OF MAKING AND REINFORCING DECORATIVE
POLYESTER RESIN PRODUCTS
Filed Aug. 14, 1964 Sheet 1 of 2
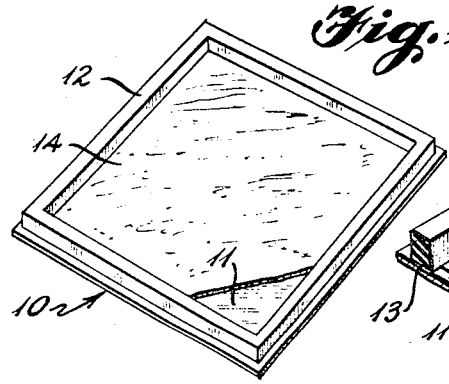
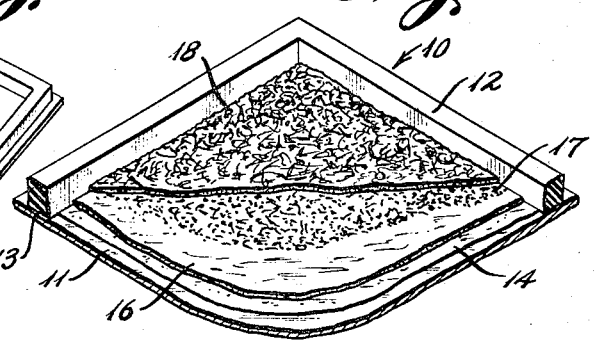
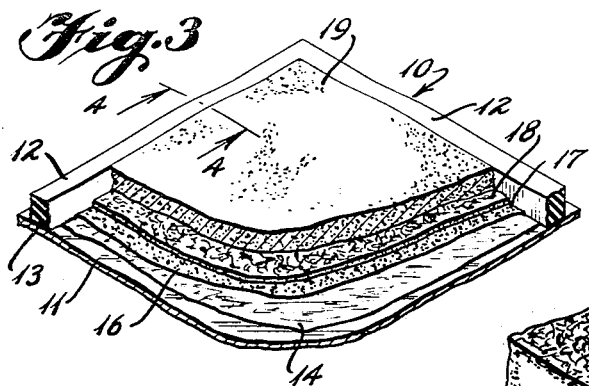
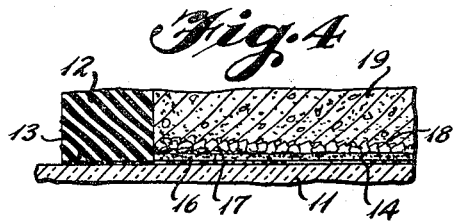
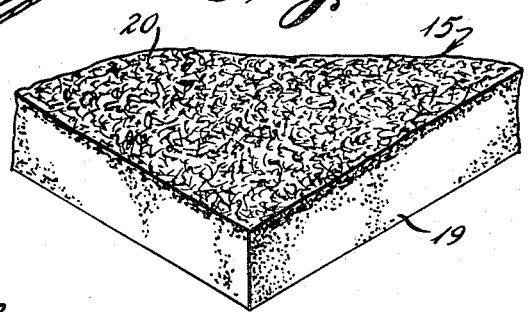
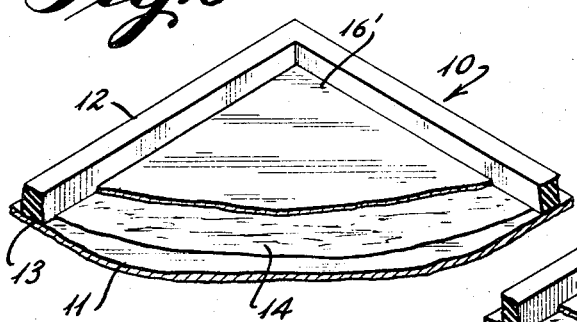
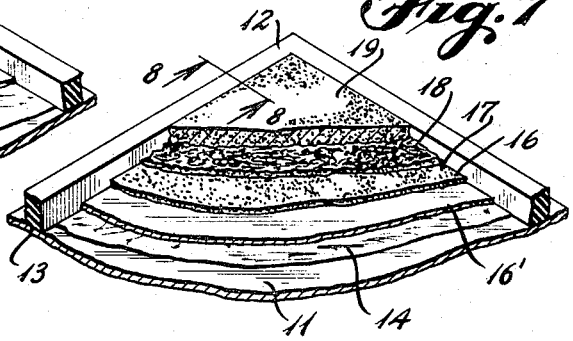
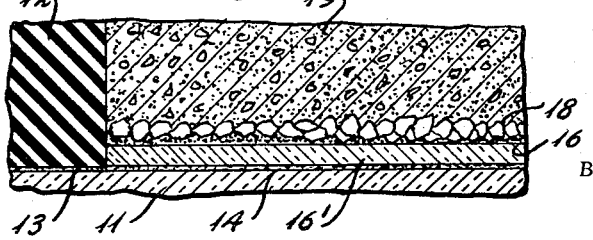
INVENTOR
Alfred Hoffman
BY
ATTORNEY INVENTOR
Alfred Hoffman
BY
ATTORNEY United States Patent Office 3,419,454
Patented Dec. 31, 1968

3,419,454
METHOD OF MAKING AND REINFORCING DECORATIVE POLYESTER RESIN PRODUCTS
Alfred Hoffman, Goncourt St., D'Anjou, Quebec, Canada
Filed Aug. 14, 1964, Ser. No. 389,554
3 Claims. (Cl. 161—5)

ABSTRACT OF THE DISCLOSURE

A product and method of making decorative building products including forming and hardening of a transparent plastic material and thereafter reinforcing said material with a cementitious material.

---

Figure 9:
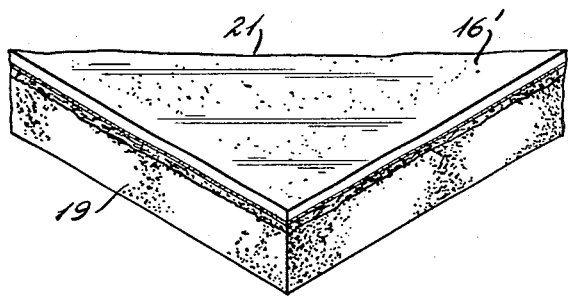

This invention relates to structures habitabel or otherwise of various designs, shapes, sizes and materials and to the method of manufacture of such structures, including those composed of masonry and other substances both natural and manufactured.

The invention relates particularly to the manufacture of decorative polyester resin products reinforced with concrete and of finished attractive artistic appearance with smooth highly polished, wrinkled or other type of surface or surfaces.

In modern multiple story buildings concrete constitutes the largest proportion of all building materials employed. The main reason for this is on account of its low cost and the structural monolithic characteristics required for exterior building materials. However, there have been drawbacks to its use including its rough unfinished appearance and its impermanence, although efforts have been made to protect and to beautify concrete structures since the beginning of the use thereof.

From the beginning of the plastic industry durability has been a characteristic needed and sought for many applications in the building trade. In an effort to obtain durability, the reinforcement of polyester resin with glass fibres has been undertaken. This reinforcement has not been successful in providing the rigidity and dimensional stability required in the building industry. Furthermore a glass fibre reinforced plastic structure will in time cause fibre prominence which adversely affects the appearance of the decorative polyester product.

Various methods of surfacing concrete with polyester resin have been known and performed by a few concrete manufacturers, but none of these methods have found recognition as satisfactory by the building industry.

The main reason for this is because of the expensive and time consuming preparations required in conditioning the concrete base before applying the polyester resin. Also the concrete had to be thoroughly dried and structurally sound, as well as free of loose particles, dirt, oil, grease or other contaminations, and have a smooth non-porous and accurately level surface. Further the old application method could never assure a permanent and inextricble bond between uncured polyester resin and the dry cured concrete base. This was because any unsaturated polyester resin is characterized by a high degree of shrinkage during the curing time. This shrinkage will always cause a substantial stress moment on the side of the concrete coated with polyester resin and which in time will deform the concrete panel and result in crazing and a loosening of the polyester resin coating.

It is an object of this invention to provide a method of making reinforced decorative polyester resin products having the rigidity ad dimensional stability necessary for materials employed in the building industry for outdoor and indoor use and for durability.

Another object of this invention is to provide a simple and practical method of making and reinforcing decorative polyester resin products in which concrete is combined with polyester resin to produce an attractive distinctive surface finish as well as a product of superior weathering qualities.

Figure 10:
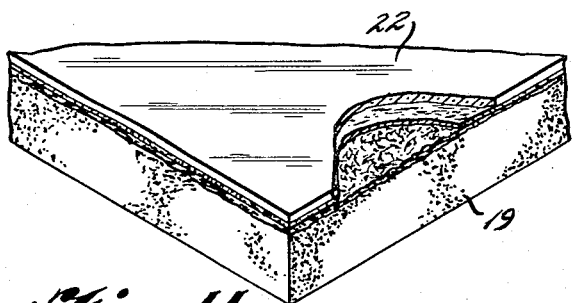
Figure 11:
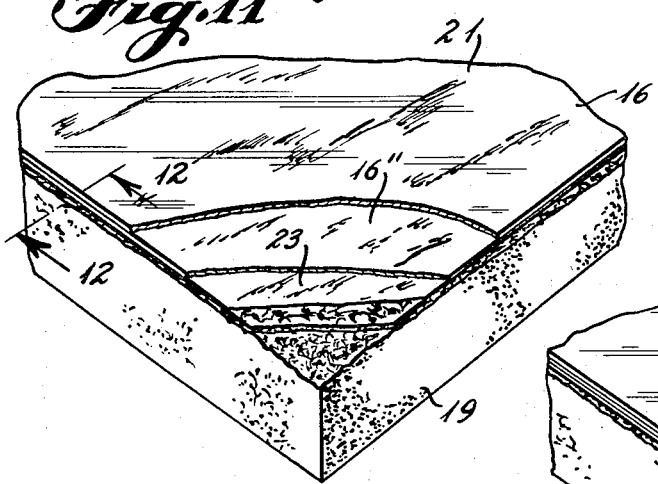
Figure 12:
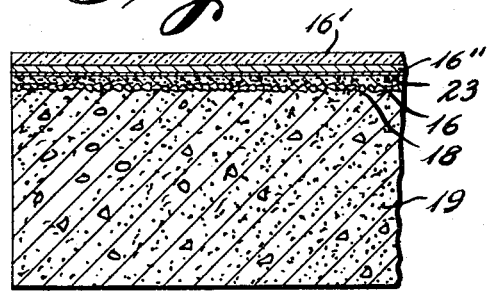

Other objects and advantages of this invention will be apparent from the following description considered in conjunction with the accompanying drawings in which:

FIG. 1 is a perspective of a mold in accordance with the present invention with silicon oil applied to the surface of the mold within the bottom cavity;

FIG. 2, an enlarged fragmentary perspective illustrating the steps in the process;

FIG. 3, a similar view including an additional or final step;

FIG. 4, a section on the line 4—4 of FIG. 3;

FIG. 5, a fragmentary perspective of one form of the finished invention after it has been removed from the mold;

FIG. 6, an enlarged perspective similar to FIG. 2 illustrating a modified process;

FIG. 7, an enlarged fragmentary detail perspective similar to FIG. 3 adding the method of FIG. 6;

FIG. 8, a fragmentary additionally enlarged section on the line 8—8 of FIG. 7;

FIGS. 9, 10, 11 and 13, fragmentary perspective views of further modified forms of the invention removed from the molds; and FIG. 12, a further enlarged section on the line 12—12 of FIG. 11.

Briefly stated the method of the present invention comprises the provision of reinforced decorative polyester resin products having the prerequisite rigidity stability and durability required of builidng products by the combining of fully cured polyester resin and wet uncured portland cement concrete with the polyester resin forming the surfacing material and the concrete forming the reinforcing underlay and with an inextricable bond between the polyester resin and the concrete, the polyester resin surface having a smooth highly decorative gloss finish having excellent weathering characteristics and in which the color is stabilized to the light so that it will not vary or become discolored.

With continued reference to the drawings, in FIG. 1 is disclosed a mold 10 consisting of a relatively thick tempered glass plate 11 having a thickness, for example of ¼ of an inch although not limited to such dimension. On the glass plate 11 is applied a square frame 12 of silicon rubber which is fastened to the plate by an adhesive 13.

In the practice of the invention, a thin coat of silicon oil 14 is applied to the surface of the tempered thick glass plate 11 within the frame 12. This silicon oil acts as a release agent between the glass and the surface of the polyester resin product contained within the frame. The silicon rubber of the frame also acts as a natural release agent around the edges of the product and because of its flexibility, the cured polyester resin product 15 contained within the frame can easily be released from the frame. The frame is of a composition to resist the heat treatment of its contents during the curing process. The tempered glass plate 11, the silicon rubber frame or molding 12 and the coating of silicon oil all are commercially available products in the trade.

After the film of silicon oil 14 is applied to the glass plate 11, a commercially available, light-stabilized and heat-resistant hardenable transparent liquid mixture 16 is applied upon the silicon oil 14. The mixture 16 includes materials which will not become discolored when subjected to light and such mixture is composed of unsaturated polyester resin, styrene, methyl methacrylate combined with a catalyst such as a cobalt naphthenate solution or a methyl ethyl keton peroxide solution. The mixture is applied in liquid form upon the glass plate 11 until it reaches a thickness of substantially 1/16 of an inch.

While this layer 16 is in its liquid stage, or prior to its solidification, a beautifying substance such as a colored mineral 17 of any desired character, as for example granite, in small particulate sizes between 1/32 to 1/4 of an inch, is sprinkled onto the mixture and allowed to sink into the same, after which lightweight stone aggregates 18 of any desired character, as for example pumice, in particle sizes between 1/4 and 3/8 of an inch, are spread over the entire surface of the mixture 16. A portion of the stone aggregate thus supplied will sink into the liquid mixture 16 and become an inextricable part thereof. The lightweight stone aggregate 18 is of a lower specific gravity preferably in order not to displace the beautifying ingredient 17 sprinkled thereupon.

Thereafter the mass is subjected to a curing period at a temperature of between 72° and 75° F. for approximately four hours and thereafter to an additional or post-curing period of approximately one hour at a temperature between 160° and 180° F., which is necessary or desirable to obtain a hard fully-cured decorative polyester resin product.

In an effort to achieve rigidity and temperature stability, a mixture 19 is composed of three parts of sand and particles of stone containing 60% sand from 0" up to 1/4" particle size and 40% stone aggregate ranging in size from 1/4 to 3/8 of an inch. To this mixture one part of portland cement and 40% water in relation to the weight of the portland cement is added. Thereafter, this mixture is applied upon the fully cured and dry polyester resin product above described, and the mass is vibrated for ten seconds to assure a maximum bond between the concrete mixture 19 and the half-exposed lightweight stone aggregate 18 imbedded in the polyester resin 16 to fill any possible voids and to achieve maximum reinforcement of the otherwise unstable polyester resin product. The mass is subjected to a twenty-four hour room temperature curing to enable the concrete to solidify sufficiently to reach its handling strength and to enable the finished product to be removed from the mold. The product thus produced has a wrinkled appearance caused by the shrinking of the polyester resin about the particles of the beautifying ingredient 17 during the curing process. A product having such wrinkled surface 20 may be preferred for certain building applications and uses including where a non-slip surface condition is desired.

A product of different surface characteristics may be obtained by applying a coating to the thick glass plate 11 of the silicon oil and adding a liquid mixture 16 to approximately 1/16 of an inch thickness, and this is allowed to cure for four hours at room temperature of between 72° and 75° F., followed by a one-hour post-curing temperature between 160° and 180° F. After a one-hour cooling period, a second layer 16' of the mixture 16 is applied directly on the first cured layer, and, while still in a liquid state, the coloring or beautifying mineral 17 and the stone aggregate 18 are applied as above described with reference to the embodiment of FIGS. 1–5.

After the curing process has been completed and the mass is hardened, the concrete mixture 19 is applied to the back of the stone aggregate 18 as previously described and allowed to cure for a twenty-four hour period, after which the product can be removed from the mold. The product thus produced has two layers of polyester resin, the one next to the glass plate having a surface 21 which is smooth, glossy, highly-polished, and transparent to allow visibility of the underlying beautifying material 17.

In FIG. 5 where only one layer of the polyester resin is employed and in which the beautifying and supplementing aggregate is contained, the composition is such that if a smooth surface is desired, it will be necessary to grind and polish the surface to the desired smoothness.

In FIG. 10 is illustrated a further modification of the product illustrated in FIGS. 6–9. In the production of the product of this figure, the same type of mold is employed as illustrated in FIG. 1. Instead, however, of applying the silicon oil 14 and then adding the polyester resin 16, a 7/32" thick tempered glass plate 22 is laid in the mold and directly upon it is applied the mixture 16. While still in the liquid stage, the coloring or beautifying ingredients 17 and the aggregate 18 are added and allowed to cure as previously described. The reinforcing concrete 19 is then applied and the curing process followed as before. The product obtained includes a tempered glass plate surface instead of a first layer of polyester resin and due to its transparency, a product results which has a highly polished granite appearance with an extremely hard and durable glass surface.

As illustrated in FIG. 11, a somewhat different surface may be obtained by modifying the product of FIG. 9 whereby the polyester resin 16 is applied to the surface of the mold as previously described and this resin allowed to cure, at which time a very thin coat of the polyester resin 16' is applied thereto and while still in a tacky condition a 10 mil thick polyester resin sheet 23, available in the trade and having a finish of a desired design such as marble or the like, is placed thereon. To the back surface of the polyester resin sheet 23 is applied the polyester resin 16 and aggregate 18, and this is allowed to cure as previously described and at such time the reinforced concrete mixture is applied thereto binding all the surfaces together.

Figure 13:
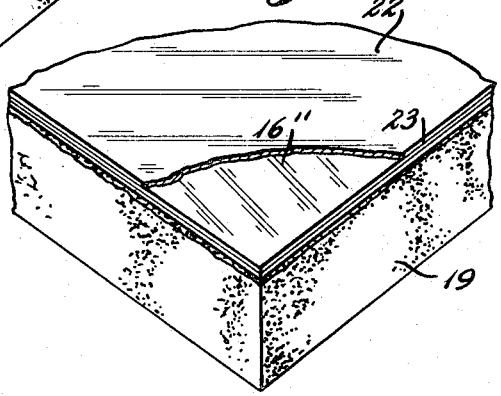

FIG. 13 is a structure similar to FIG. 10 except that the coloring or beautifying ingredients have been omitted and the procedures followed as just described and illustrated in FIG. 11 by substituting the polyester resin sheet 23.

From the foregoing, it will be apparent that a highly decorative and useful product is obtained of improved character by a new process and that it will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The method of making and reinforcing decorative resin products comprising the steps of providing a mold having a cavity with a smooth bottom surface, applying a release agent of silicon oil to said mold cavity, introducing a mixture of unsaturated polyester resin, styrene and methyl methacrylate in liquid form to which a catalyst of cobalt naphthenate and methyl ethyl ketone peroxide has been added into said mold cavity, sprinkling a coloring and beautifying mineral particles on said liquid and permitting such mineral particles to sink thereinto, adding lightweight stone aggregate over the entire surface of said liquid mixture, permitting said aggregate to partially sink into said liquid and become partly imbedded therein, allowing the liquid to partially cure at room temperature to form a solid integral mass, fully curing said mass to harden at a temperature of between 160° to 180° F. for approximately one hour, introducing a cementitious material consisting of portland cement and water in a flowable state onto said cured mass, vibrating said mass to cause intimate engagement between said aggregate and said cementitious material, allowing said cementitious material to solidify, and removing said product from said mold.

2. The method of making and reinforcing decorative resin products comprising the steps of providing a mold having a cavity with a smooth bottom surface, applying a release agent of silicon oil to said mold cavity, introducing a first liquid mixture of unsaturated polyester resin, styrene and methyl methacrylate to which a catalyst of cobalt napthenate and methyl ethyl ketone peroxide has been added into said mold cavity, allowing said liquid mixture to partially cure at room temperature to form a solid mass, fully curing said mass at a temperature of between 160° and 180° F. for approximately one hour, applying a second liquid mixture of unsaturated polyester resin, styrene and methyl methacrylate to which a catalyst of cobalt napthenate and methyl ethyl ketone peroxide has been added onto the surface of said cured mixture, sprinkling coloring and beautifying mineral particles on said second mixture and permitting said mineral particles to sink thereinto, adding lightweight stone aggregate over the entire surface of said second liquid mixture, permitting said aggregate to partially sink into said second mixture and become partially imbedded therein, allowing the second mixture to partially cure at room temperature to form a solid integral mass, fully curing said second mixture mass at temperature of between 160° to 180° F. for approximately one hour, introducing a cementitious material consisting of portland cement and water in a flowable state onto said cured mass, vibrating said mass to cause intimate engagement between said aggregate and said cementitious material, allowing said cementitious material to solidify, and removing said product from said mold.

3. A decorative reinforced tile comprising a first layer of hardened transparent catalyzed mixture of unsaturated polyester resin, styrene and methyl methacrylate and containing as catalyst cobalt napthenate and methyl ethyl ketone peroxide having a mineral particle coloring substance disposed therein and a second layer of lightweight stone aggregate partially imbedded within said first layer, and a third layer of cementitious material consisting of solidified portland cement partially imbedding said lightweight aggregate, whereby said first layer is integrally connected to said third layer to form a decorative and weather resistant surface therefor.

References Cited
UNITED STATES PATENTS

| | | | |
|---|---|---|---|
| 2,890,492 | 9/1959 | Smith | 264—256 |
| 2,951,001 | 8/1960 | Rubenstein | 156—245 |
| 3,097,080 | 7/1963 | Weir | 264—255 |
| 3,324,213 | 6/1967 | Anfinset | 264—255 |

ROBERT F. BURNETT, *Primary Examiner.*

WILLIAM J. VAN BALEN, *Assistant Examiner.*

U.S. Cl X.R.

161—162; 156—246, 314; 264—255, 256